Figure 3:
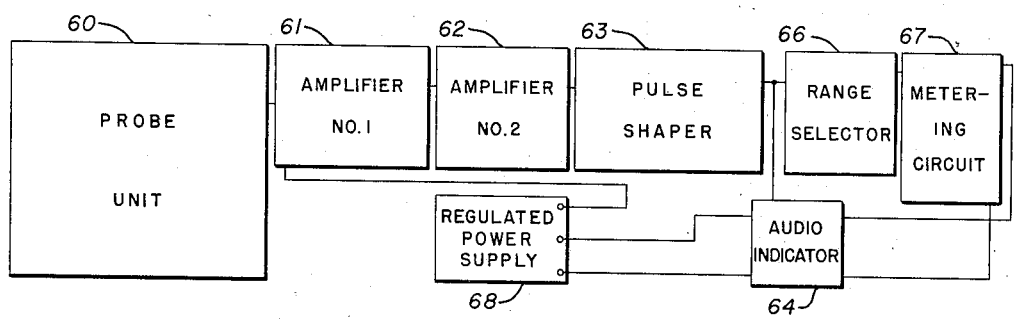

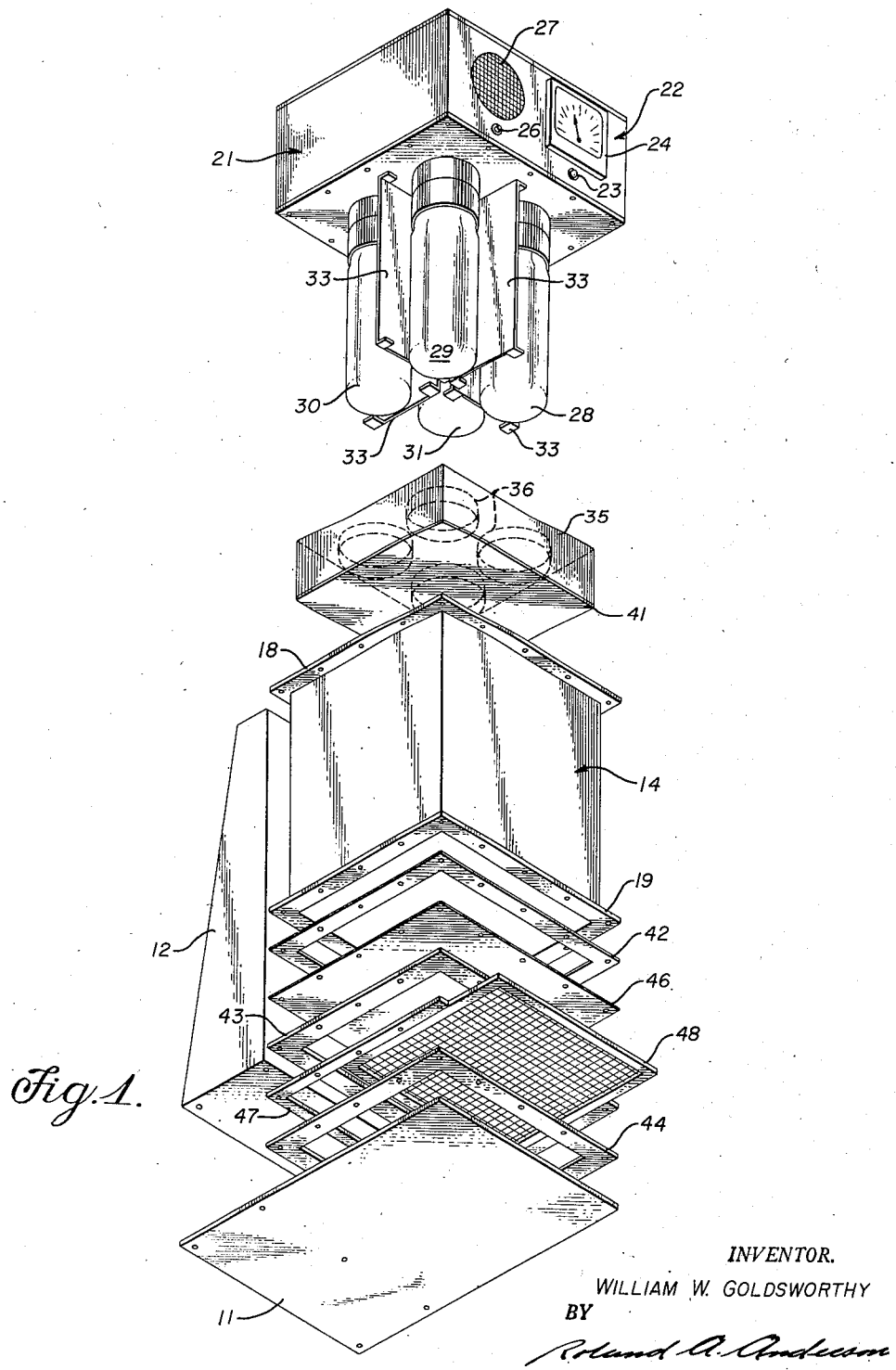

Feb. 4, 1958 W. W. GOLDSWORTHY 2,822,479
RADIATION COUNTER
Filed Feb. 25, 1954 4 Sheets-Sheet 2

INVENTOR.
WILLIAM W. GOLDSWORTHY
BY
ATTORNEY.

Feb. 4, 1958   W. W. GOLDSWORTHY   2,822,479
RADIATION COUNTER
Filed Feb. 25, 1954   4 Sheets-Sheet 3

INVENTOR.
WILLIAM W. GOLDSWORTHY
BY
ATTORNEY.

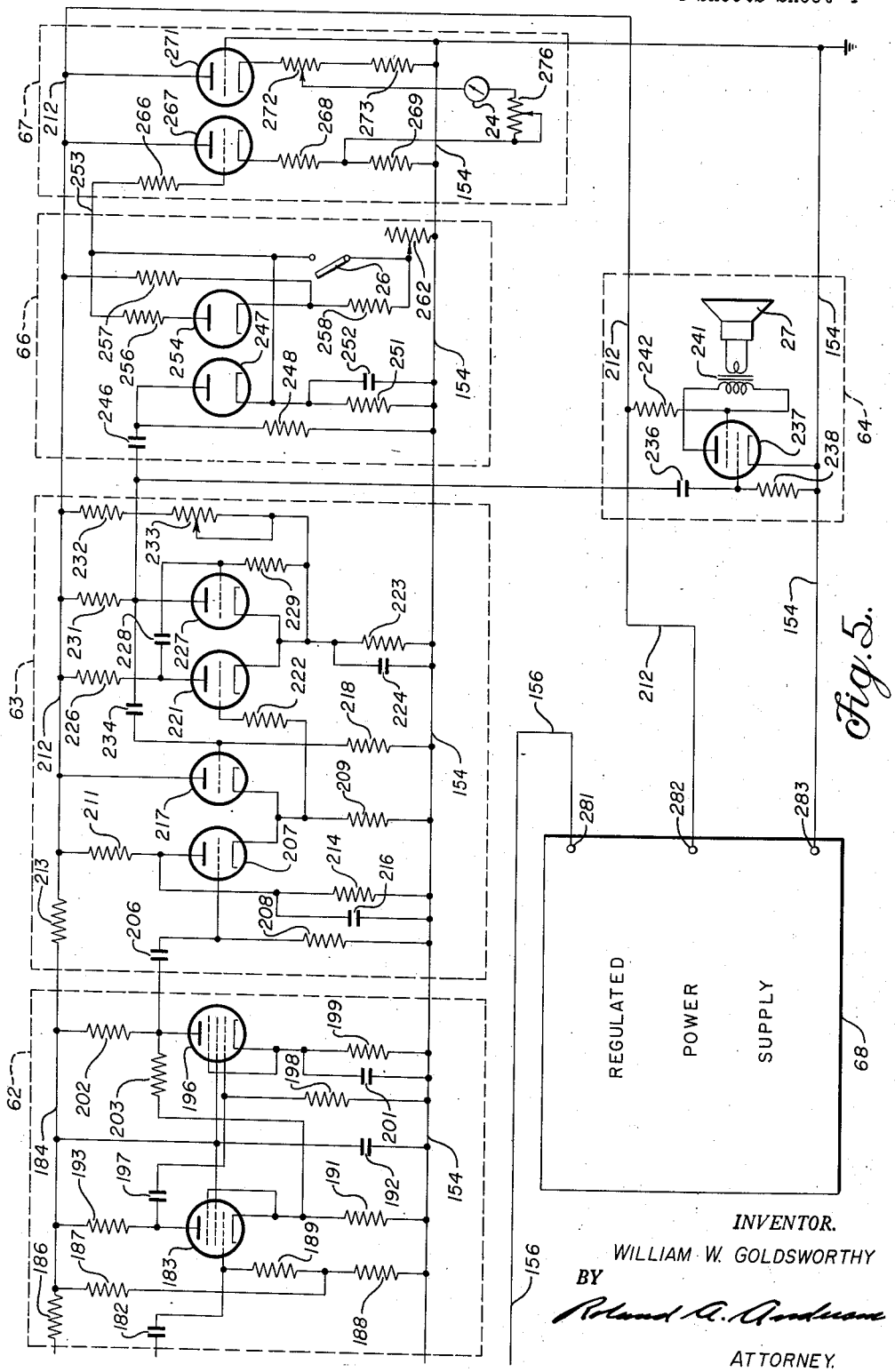

United States Patent Office 2,822,479
Patented Feb. 4, 1958

2,822,479

RADIATION COUNTER

William W. Goldsworthy, Orinda, Calif., assignor to the United States of America as represented by the United States Atomic Energy Commission Application February 25, 1954, Serial No. 412,670

6 Claims. (Cl. 250—71)

The present invention relates to a radiation counter and, more particularly, to a scintillation counter for measuring the radioactive contamination of hands and feet.

With the increased usage of radioactive materials in laboratories, hospitals, and industrial plants, it has become necessary to provide a convenient and reliable device so that workers with such materials can inform themselves of contamination, particularly of their hands and feet. For the foregoing purpose the radiation detecting device should have characteristics as follows:

(1) High uniform sensitivity over a wide area;
(2) Capability to measure alpha, beta, and gamma contamination over wide energy ranges;
(3) Be difficult to contaminate and easy to decontaminate;
(4) Be insensitive to shock and power line disturbances;
(5) Be usable for long periods without probe replacement; and
(6) Be easy to adjust and maintain.

Inherent characteristics of gas-filled proportional counters and of Geiger counters are such as to render a device based upon the operation thereof incapable of satisfying all of the above-stated requirements. For example, gas-filled proportional counters are sensitive to shock, sensitive to power supply disturbances, difficult to maintain, and not uniformly sensitive over a wide area. Also, Geiger tubes have poor life time characteristics and are normally useless for counting alpha particles.

To overcome such disadvantages and to meet the above-listed desirable characteristics, the present invention is based upon the principles of scintillation counters with a plurality of photomultiplier tubes disposed adjacent a layer of scintillation material which extends over a substantially large area. Those characteristics which cannot be met inherently by the foregoing, are achieved by the associated circuitry.

It is therefore an object of the present invention to provide a new and improved radiation counter.

Another object of the invention is to provide a hand and foot counter capable of measuring alpha, beta, and gamma radiation.

A further object of the invention is to provide a radiation counter characterized by high uniform sensitivity over a wide area.

Still another object of the invention is to provide a radiation counter for hand and foot monitoring which is difficult to contaminate and easy to decontaminate.

Another important object of the invention is to provide a radiation counter which is easy to adjust and maintain while being insensitive to shock and power line disturbances.

A still further object of the invention is to provide a radiation counter useful over a wide counting range by an automatic scale switching circuit.

Figure 2:
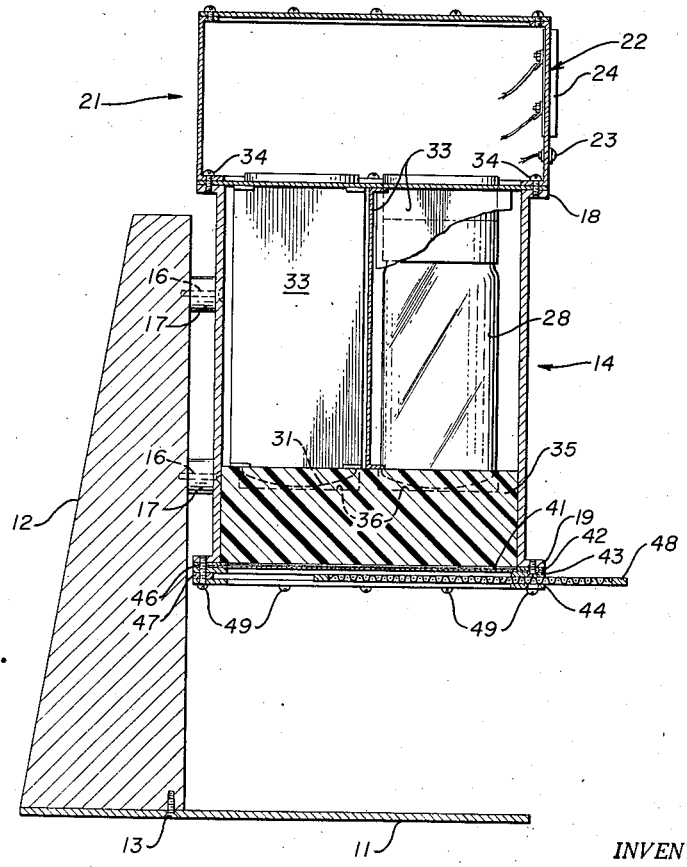
Figure 4:
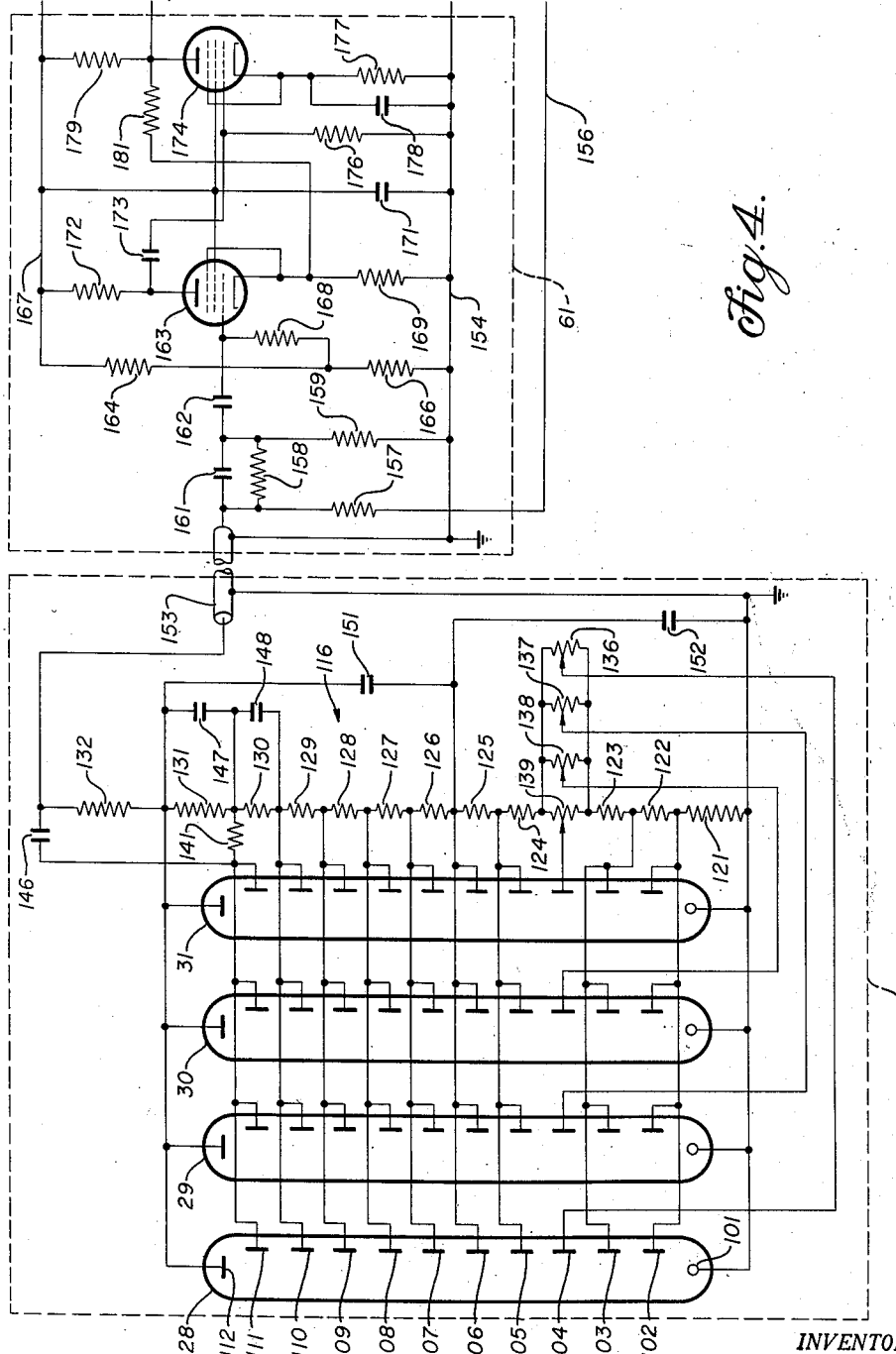

Further objects and advantages of the invention will be apparent in the following description and claims considered together with the accompanying drawing, in which:

Figure 1 is an exploded isometric view of the invention;
Figure 2 is an elevation, partly in section, of the invention of Fig. 1;
Figure 3 is a block diagram of the circuitry of the invention of Fig. 1;
Figure 4 is a schematic wiring diagram of a portion of the circuitry of the invention; and
Figure 5 is a schematic wiring diagram of the remainder of the circuitry of the invention.

Referring to the drawing in detail, Figs. 1 and 2 in particular, there is provided a base plate 11 and a support member 12. Such support member 12 is suitably secured, as by screws 13, to the base plate 12 and extended substantially perpendicular therefrom. A probe housing 14 is mounted by screws 16 and spacers 17 on the support member 12 with the lower extremity spaced-apart from the base plate 11. The housing 14 is open at the top and bottom, as mounted, and such open ends are provided with outwardly extended flanges 18 and 19, respectively.

An inclosed chassis 21 is provided with a panel 22 which mounts an indicating lamp 23, a milliammeter 24, a zero-set push button switch 26, and a loudspeaker 27. In the presently-described embodiment the chassis 21 houses the electrical components of the invention and provides suitable mountings for four, externally extended, photomultiplier tubes 28, 29, 30, 31; however, it will be readily apparent that the photomultiplier tube circuit may be contained in the chassis 21 while the remainder of the circuit is remotely positioned. Shields 33 are disposed between adjacent tubes 28—31 and are suitably mounted in place on the chassis 21. Preferably the chassis 21 is dimensioned greater than the inside dimensions of the housing 14 so that the chassis may be readily mounted upon the upper flange 18, as by screws 34, with the tubes 28—31 disposed within housing 14. A block 35 of clear material having good light transfer characteristics is provided with four recessed portions 36 to receive the tubes 28—31. The housing 14 is dimensioned in the longitudinal direction to be substantially equal to the combined length of the photomultiplier tubes 28—31, as mounted on the chassis 21, and the block 35 of clear material.

The detector portion of the invention, other than the photomultiplier tubes 28—31, is a phosphor 41 comprising a thin layer of anthracine flake crystals covered with a second thin layer of silver activated zinc sulfide. The anthracine flakes form the beta and gamma detecting portion of the phosphor 41 and zinc sulfide forms the alpha detecting portion. Preferably the phosphor 41 is bonded to one surface of the block 35 of clear material and the tubes 28—31 are bonded to the recessed portions 36 thereof. In such manner then scintillations of light in the phosphor 41 are readily transferred to the light sensitive element of the tubes 28—31.

Three similar retaining and spacing frames 42, 43, 44 are provided to be secured to the flange 19 of the housing 14 and having central openings to permit the passage of radiation. A thin sheet 46 of aluminum, which serves as a window to radiation but is impervious to light, is disposed between two of the frames 42, 43 which are nearest the housing 14. A three-sided frame 47, having outside dimensions matching the other frames 42, 43, 44 but lesser inside dimensions, and a screen 48 are provided between the two frames 43, 44 so as to protect the sheet 46 of aluminum from contamination and mechanical damage. Such elements may be readily secured to the flange 19 in a conventional manner, as by screws 49, thus rendering the screen 48 slideable with respect to the assembly for ease of replacement.

With the foregoing elements properly assembled, a hand may be monitored for contamination by placing the hand between the base plate 11 and the screen 48. Any contamination on the hand will emit radiation which will penetrate the sheet 46 of aluminum and reach the phosphor 41. Scintillations result in the phosphor 41 and are picked up by the light sensitive elements of the photomultiplier tubes 28—31 which view equal areas of the phosphor.

The counting circuit of the invention comprises, in general, a probe unit 60 (the photomultiplier tubes 28—31 and phosphor 41), a first amplifier 61, a second amplifier 62, a pulse shaper 63, an audio indicator 64, a range selector 66, a metering circuit 67, and a regulated power supply 68 (see Fig. 3). Radiation received at the probe unit 61 is converted to electrical energy which is utilized to give an audio signal at the loud speaker 27 and a visual indication at the meter 24.

Referring to the circuitry in detail, see Figs. 4 and 5, it is to be noted that each of the photomultiplier tubes 28, 29, 30, 31 is identical with the others in structure, i. e., each tube has a light sensitive element 101, ten serially disposed dynodes 102–111, and an anode 112. To supply suitable operating potentials to the tubes 28—31, a single resistance voltage divider 116 is provided which comprises twelve serially-connected resistors 121–132 and four parallel-connected potentiometers 136–139 with the latter connected in series with the former between the third and fourth resistors 123, 124. One end of the first resistor 121 is connected to ground and to the light sensitive element 101 of each of the tubes 28—31. The junction between the first and second resistors 121, 122 is connected to the first dynode 102 of each of the tubes 28—31. Similarly, the junction between the second and third resistors 122, 123 is connected to the second dynode 103 of each of the tubes 28—31. The adjustable elements of the potentiometers 136—139 are respectively connected to the third dynodes of the tubes 28—31. In such manner the operation of the photomultiplier tubes 28—31 may be balanced individually without interaction. The junction between the fourth and fifth resistors 124, 125 is connected to the fourth dynode 105 of the tubes 28—31 and the successive junctions between the resistors 125—130 of the voltage divider 116 are respectively connected to the successive dynodes 106—110. The junction between the tenth and eleventh resistors 130, 131 is connected to the final or tenth dynode 111 of the tubes 28—31 through a resistor 141. To complete the voltage connections of the tubes 28—31, the junction between the final two resistors 131, 132 of the voltage divider 116 is connected to the anodes 112 of such tubes.

The output of the photomultiplier tubes 28—31 is taken from the tenth dynodes 111 and for such purpose a coupling capacitor 146 is connected from the specified dynodes to the resistor 132 at the end of the voltage divider 116 which is not grounded. To minimize the effects of the signal upon the voltage divider 116, a by-pass capacitor 147 is connected in parallel with the eleventh resistor 131 and a second by-pass capacitor 148 is connected in parallel with the tenth resistor. For the same purpose, a by-pass capacitor 151 is connected from the junction between the eleventh and twelfth resistors 131, 132 to the junction between the fifth and sixth resistors 125, 126, and a second by-pass capacitor 152 is connected from the latter junction to the grounded end of the voltage divider 116. Such connection of the capacitors 151 and 152 permit the use of substantially low voltage capacitors instead of higher priced high voltage capacitors. The junction between the coupling capacitor 146 and the final resistor 132 of the voltage divider 116 is connected to the center conductor of a coaxial cable 153. The outer conductor of the cable 153 is connected to ground and thus is connected to carry both a varying signal voltage and a high voltage operating potential for the tubes 28—31.

The other end of the cable 153 is extended to the first amplifier 61 where the outer conductor is connected to a grounded lead 154 and the center conductor is connected to a high voltage lead 156 through a resistor 157. The center conductor of the cable 153 is also connected to the grounded lead 154 through two series-connected resistors 158 and 159 which together with the other resistor 157 form a voltage divider. Two series-connected coupling capacitors 161 and 162 are connected between the center conductor of the cable 153 and the control grid of a first pentode type amplifier tube 163 with the junction between such capacitors directly connected to the junction between the two resistors 158 and 159 of the last-referenced voltage divider. To provide suitable bias for the amplifier tube 163, there is provided another voltage divider comprising two series-connected resistors 164 and 166 connected between a positive lead 167 and the grounded lead 154 with the junction between such resistors connected to the control grid of the tube 163 through a grid resistor 168. The suppressor grid of the pentode tube 163 is directly connected to the cathode which, in turn, is connected to the grounded lead 154 through a resistor 169. To impress a suitable potential on the screen grid of the tube 163, a direct connection is made to the positive lead 167 and a by-pass capacitor 171 is connected from such tube element to the grounded lead 154. As a final operating connection of the tube 163 a dropping resistor 172 is connected between the anode and the positive lead 167.

To couple voltage changes at the anode of the pentode tube 163 to a second stage of amplification, a coupling capacitor 173 is connected from such anode to the control grid of a second pentode type amplifier tube 174. A grid resistor 176 is connected from the control grid of the tube 174 to the grounded lead 154 to suitably develop signal voltages. The suppressor grid of such tube 174 is directly connected to the cathode which, in turn, is connected through a parallel-connected resistor 177 and capacitor 178 to the grounded lead 154. A direct connection is made from the screen grid of the second tube 174 to the screen grid of the first tube 163 for suitable operating voltage. To complete the operating connections of the second tube 174, a dropping resistor 179 is connected from the anode to the positive lead 167. A negative feedback connection is provided by connecting a resistor 181 between the anode of the second tube 174 and the cathode of the first tube 163.

The foregoing amplifier 61 will be seen to be a conventional two stage pulse amplifier with negative feedback provided for stability. The output of such amplifier 61 is taken from the anode of the second tube 174 by connecting one side of a coupling capacitor 182 thereto and is impressed upon the second amplifier 62 by connecting the other side of the coupling capacitor to the control grid of a first pentode type amplifier tube 183. A second positive lead 184 is connected to the first positive lead 167 through a resistor 186 and is a source of positive operating potential for the second amplifier 62. To supply suitable bias a voltage divider comprising two series-connected resistors 187, 188 is connected from the second positive lead 184 to the grounded lead 154 with the junction between such resistors connected to the control grid of the amplifier tube 183 through a resistor 189. The suppressor grid of the tube 183 is directly connected to the cathode which, in turn, is connected to the grounded lead 154 through a resistor 191. The screen grid of such tube 183 is directly connected to the second positive lead 184 and is connected through a by-pass capacitor 192 to the grounded lead 154. A dropping resistor 193 is connected from the anode of the tube 183 to the second positive lead 184 to complete the operating connections of the tube.

Voltage changes at the anode of the first amplifier tube 183 are coupled to the control grid of a second pentode type amplifier tube 196 by a coupling capacitor 197 connected therebetween. Such control grid of the second tube 196 is also connected to the grounded lead 154 through a resistor 198. The suppressor grid of the second tube 196 is directly connected to the cathode which, in turn, is connected to grounded lead 154 through a resistor 199 having a by-pass capacitor 201 connected in parallel therewith. The screen grid of the second tube 196 is connected to the screen grid of the first amplifier tube 183 for suitable potential. A dropping resistor 202 is connected from the anode of the second tube 196 to the second positive lead 184. For stability of operation a negative feedback connection is provided by connecting a resistor 203 from the anode of the second amplifier tube 196 to the cathode of the first amplifier tube 183.

The output of the second amplifier 62, as developed at the anode of the second amplifier tube 196 thereof, is coupled to the pulse shaper 63 by a capacitor 206 connected between such anode and the control grid of a first triode tube 207. A resistor 208 is connected from the control grid of the first triode tube 207 to the grounded lead 154 to provide in combination with the coupling capacitor 206 a differentiating circuit having a substantially short time constant in comparison with the duration of input signals. The cathode of the tube 207 is connected through a resistor 209 to the grounded lead 154 and the anode is connected through a dropping resistor 211 to a third positive lead 212 which, in turn, is connected to the second positive lead 184 through a resistor 213. For stability of operation a parallel-connected resistor 214 and capacitor 216 combination is connected from the anode of the tube 207 to the grounded lead 154. A second triode type tube 217 is provided with the cathode directly connected to the cathode of the first triode tube 207, the anode directly connected to the third positive lead 212, and the control grid connected to the grounded lead 154 through a resistor 218. Variations in voltage at the cathode of the first triode tube 207 are transferred to the control grid of a third type triode tube 221 by a resistor 222 connected therebetween. The cathode of the third tube 221 is connected to the grounded lead 154 through a resistor 223 with a by-pass capacitor 224 connected in parallel therewith and the anode is connected to the third positive lead 212 through a dropping resistor 226. The anode of such third triode tube 221 is also connected to the control grid of a fourth triode type tube 227 through a coupling capacitor 228. A resistor 229 is connected from the control grid of the fourth tube 227 to the cathode thereof and a dropping resistor 231 is connected from the anode to the third positive lead 212. A resistor 232 and potentiometer 233 are connected in series from the cathode of the fourth tube 227 to the third positive lead 212 with the adjustable element of the potentiometer connected to one end thereof so that the voltage impressed at the cathode is adjustable. The remaining operating connection of the pulse shaper 63 is made by connecting a coupling capacitor 234 from the anode of the fourth tube 227 to the control grid of the second tube 217. With the connections and elements as stated, the pulse shaper 63 provides at the anode of the fourth tube 227 a rectangular voltage output pulse having uniform height and duration in response to each input pulse but independent of the height and duration of such input pulse.

A coupling capacitor 236 is connected from the anode of the fourth triode tube 227 in the pulse shaper 63 to the control grid of a tetrode type amplifier tube 237 in the audio indicator 64. A resistor 238 is connected from the control grid of the tetrode tube 237 to the grounded lead 154 and a direct connection is made from the cathode to the grounded lead 154 as part of the operating connections of the tube. One winding of a transformer 241 is connected between the anode and screen grid of the tetrode tube 237 with the screen grid connected to the third positive lead 212 through a resistor 242 to complete the connections of the tube. The second winding of the transformer 241 is connected across the coil (not shown) of the loud speaker 27.

To provide measurement of a substantially wide range of counting rates without the necessity of manual range switching, the range selector 66 is utilized between the pulse shaper 63 and the metering circuit 67. Thus, a coupling capacitor 246 is connected from the anode of the fourth triode tube 227 in the pulse shaper 63 to the anode of a first diode type tube 247 with a resistor 248 connected between the anode of the latter tube and the grounded lead 154 in the range selector 66. A parallel-connected combination of a resistor 251 and capacitor 252 is connected from the cathode of the first diode tube 247 to the grounded lead 154 to provide a rectified voltage and a proper time constant so that the voltage is proportional to the count rate. The cathode of the first diode tube 247 is connected to an output lead 253. The anode of a second diode tube 254 is connected through a resistor 256 to the output lead 253 and the cathode is connected to the junction of two resistors 257 and 258 which are series-connected between the third positive lead 212 and the adjustable element of a potentiometer 262, one end of which is connected to the grounded lead 154. The values of the two resistors 257 and 258 are selected so that a suitable bias is impressed at the cathode of the second diode tube 254 to render the tube nonconductive until the anode voltage reaches a predetermined level. It is to be noted that the resistor 256 in the anode circuit of the second diode tube 254 is substantially parallel-connected with the resistor 251 in the cathode circuit of the first diode tube 247 when the second diode tube is conductive. In such manner then the time constant of the cathode circuit of the first diode tube 247 is automatically changed. The zero-set switch 26 is connected between the cathode of the first diode tube 247 and the adjustable element of the potentiometer 262, and such connections provide a means for impressing a positive voltage at the cathode of the first diode tube 247 so that signal voltages at the anode do not pass to the lead 253.

The output lead 253 of the range selector 66 is extended to the metering circuit 67 and connected through a current-limiting resistor 266 to the control grid of a first triode type tube 267. The anode of the first triode tube 267 is directly connected to the third positive lead 212 and the cathode is connected through two series-connected resistors 268 and 269 to the grounded lead 154. A second triode tube 271 is provided with the anode directly connected to the third positive lead 212, the control grid directly connected to the grounded lead 154, and the cathode connected through a series-connected potentiometer 272 and resistor 273 to the grounded lead. A potentiometer 276 having the adjustable element connected to one end thereof is connected in series with the milliammeter 24 and the combination is, in turn, connected between the junction of the two resistors 268 and 269 in the cathode circuit of the first triode tube 267 to the adjustable element of the potentiometer 272 in the cathode circuit of the second triode tube 271. Thus, it will be seen that the metering circuit 67 is conventional and that the potentiometer 272 in the cathode circuit of the second tube 271 provides for zero adjustment of the milliammeter 24.

To provide suitable potentials to the circuit, the regulated power supply 68 has a high voltage terminal 281, to which is connected the high voltage lead 156, a low voltage terminal 282, to which is connected the third positive lead 212, and a grounded terminal 283, to which is connected the grounded lead 154. Both the high and low voltage terminals 281 and 282 are positive in polarity with respect to the grounded terminal 283.

Now, with the structural components and circuit elements assembled in the manner described above consider the operation of the invention. The first step in operation is to energize the regulated power supply 68 so that suitable potentials are applied to the circuit. The indicating lamp 23 is arranged to operate when the regulated power supply is energized and such arrangement is conventional. Under the foregoing circumstances radioactive material placed between the base plate 11 and guard screen 48 will result in radiation reaching the phosphor 41. As stated previously the phosphor 41 has two layers, one being sensitive to beta and gamma radiation and the other being sensitive to alpha radiation. As radiation reaches the phosphor 41 scintillations occur in that layer which is sensitive to the particular radiation.

Each of the four photomultiplier tubes 28—31 views an equal section of the phosphor 41 so that light from the scintillations will fall principally upon the light-sensitive element 101 of the nearest tube. Electrons are then freed at the light-sensitive element 101 and accelerated in increasing numbers by the successive dynodes 102—111 to the anode 112 in the conventional manner for photomultiplier tubes. Voltage variations developed at the final dynode 111 of the tubes 28—31 are then transmitted to the first amplifier 61 by the coaxial cable 153. The first and second amplifier 61 and 62 are similar and provide amplification of the signal voltages with minimum distortion.

The output of the second amplifier 62 is connected to the pulse shaper 63 which is basically a one-shot multivibrator. The capacitor 206 and resistor 207 provide a differentiator circuit which sharpens the impressed pulses. The output of such differentiator is applied to the first triode tube 207 which is connected as a cathode follower and drives the third triode tube 221. The anode and cathode of the third triode tube 221 are coupled to the fourth triode tube 227 which is connected to the second triode tube 217. With such arrangement a positive pulse at the control grid of the first tube 207 results in a positive pulse at the control grid of the third tube 221. The fourth triode tube 227 is normally conductive so that the positive pulse impressed at the control grid of the third tube 221 results in a negative pulse at the control grid of the fourth tube to render the tube nonconductive. The coupling capacitor 234 between the anode of the fourth tube 227 and the control grid of the second tube 217 becomes charged and places a positive voltage at the control grid of the latter tube. In such manner then the second tube 217 conducts and "takes over" the driving function of the first tube 207. The value of the resistor 218 in the control grid circuit of the second tube 217 is selected to provide a predetermined time constant for the discharge of the coupling capacitor 234, preferably longer than the duration of the differentiated voltage. It is to be noted that the input signal is isolated from the one-shot multivibrator circuit after the initial triggering action so that the possibility of interference by the input pulse is removed. Also, for each input pulse, regardless of magnitude and duration, there is always a rectangular output pulse having the same magnitude and duration.

The output pulse of the pulse shaper 63 is coupled to the input of the audio indicator 64 which is a conventional audio amplifier and loudspeaker arrangement. The result is an audible indication of each pulse.

Also, the output pulse of the pulse shaper 63 is coupled to the range selector 66 where the pulses are rectified by the first diode tube 247. The voltage then developed across the resistor 251 and capacitor 252 combination in the cathode circuit of the first diode tube 247 is proportional to the count rate and is coupled by the output lead 253 to the metering circuit 67.

To automatically increase the range of the milliammeter 24 the second diode 254 of the range selector 66 is biased to conduct at a predetermined level of voltage at the output lead 253 and thereby adds the resistor 256 into the circuit to reduce the count rate sensitivity. In the presently described embodiment a scale was selected which is linear from 0 to 100 for the first half of the meter scale and linear from 100 to 1000 for the other half. The values of the resistors 257 and 258 in the cathode circuit of the second diode tube 254 are selected so that the diode tube will not conduct until the voltage level of the output lead 253 provides a half scale deflection on the meter 24. The resistor 256 in the anode circuit of the second diode tube 254 is selected so that in combination with the resistor 251 in the cathode circuit of the first diode tube 247 a full scale deflection on the meter is equivalent to 1000.

Thus, there is provided a counter which requires a minimum of maintenance and in which the contamination problem is practically eliminated by the use of the easily replaceable screen guards 48. The circuit of the counter provides excellent stability, sensitivity, and uniform efficiency to a wide range of alpha, beta, and gamma emitters. Fast metering response is attained which minimizes the time of making contamination determinations, thereby reducing the reluctance of some personnel to using such counters. The counter may be disposed in a readily accessible location, turned on, and then left unattended for long periods of time.

While the salient features of the present invention have been described with respect to one embodiment, it will be apparent that numerous modifications may be made within the spirit and scope of the invention, and it is therefore not desired to limit the invention to the exact details shown except insofar as they may be defined in the following claims.

What is claimed is:

1. In a radiation counter, the combination comprising a housing open at both ends, a planar light-tight radiation window secured across one end of said housing, a removable guard screen slideably mounted parallel to and spaced from said window and external of said housing, a scintillation detector of atomic radiation disposed parallel to and coextensive with said window internal of said housing, a plurality of photomultiplier tubes disposed in parallel relation in said housing to view equal portions of said detector and mounted on a chassis providing a light-tight seal at the other end of said housing, each of said tubes having a light-sensitive cathode, a plurality of dynodes, and an anode, a single voltage divider having a plurality of taps successively connected to the elements of said tubes to supply operating potentials, separate variable means included in the connection of one of said dynodes of each tube to said voltage divider for balancing the operation of said tubes, circuit means disposed on said chassis and connected to said tubes for providing indication of radiation piercing said window and support means mounted on a base and affixed to said housing with said radiation window disposed adjacent to and parallel to said base.

2. In a radiation counter, the combination comprising a probe having a planar phosphor with a plurality of photomultiplier tubes disposed in parallel relation adjacent thereto, means connected to said tubes for applying operating voltages and including variable elements for independently adjusting the gain of said tubes, amplifier means connected to said tubes for increasing the strength of signal pulses developed, a pulse shaper connected to said amplifier means for developing a uniform pulse in response to each signal pulse, an audio indicator connected to said pulse shaper, an automatic range selector connected to said pulse shaper for developing a voltage proportional to the repetition rate of signal pulses and altering the time constant of the selector at a predetermined value of proportional voltage, and a metering circuit connected to said range selector.

3. In a radiation counter, the combination comprising a probe unit having a planar phosphor with a plurality of photomultiplier tubes disposed in parallel relation adjacent thereto, each of said tubes having a light-sensitive cathode, a plurality of dynodes, and an anode, means connecting the elements of said tubes in parallel with the third dynodes free, a single voltage divider having a plurality of taps successively connected to the parallel connected elements of said tubes and including a plurality of parallel-connected potentiometers with a variable element independently connected to said third dynodes, amplifier means connected to said tubes for increasing the strength of signal pulses developed, a pulse shaper connected to said amplifier means for developing a uniform pulse in response to each signal pulse, and means connected to said pulse shaper for indicating the presence of atomic radiation at said phosphor.

4. In a radiation counter, the combination comprising a probe having a planar phosphor with a plurality of photomultiplier tubes disposed in parallel relation adjacent thereto, single means connected to said tubes for applying operating voltages and including separate variable elements for independently balancing the gain of each of said tubes, amplifier means connected to said tubes for increasing the strength of signal pulses developed, a one-shot multivibrator connected to said amplifier means for developing a uniform pulse in response to each signal pulse, an audio indicator connected to said one-shot multivibrator, an autiomatic range selector connected to said one-shot multivibrator and having a circuit for developing a voltage proportional to the repetition rate of the uniform pulses with means included for automatically altering the time constant of said circuit when the proportional voltage reaches a predetermined value, and metering means connected to said range selector.

5. The combination of claim 4 wherein said one-shot multivibrator comprises four vacuum tubes having at least a cathode, control grid, and anode, the first of said tubes being connected as a cathode follower to drive the third tube, means coupling the third tube to drive the fourth tube, bias means connected to the fourth tube for rendering the tube conductive, a capacitor and resistor combination connected between the anode of the fourth tube and the control grid of the second tube, the first and second tubes interconnected to have a common cathode resistor whereby uniform pulses are developed at the anode of the fourth tube without interference of input pulses to the first tube.

6. The combination of claim 4 wherein said automatic range selector comprises a first diode tube having the anode connected to said one-shot multivibrator, a resistor and capacitor combination connected to the cathode of said first diode tube for developing a voltage proportional to the repetition rate of signal pulses, a second diode tube having the anode connected to said combination through a resistor, bias means connected to the cathode of said second diode tube whereby said second diode tube is conductive only when voltage across said combination exceeds bias voltage to alter the time constant of said combination.

References Cited in the file of this patent

UNITED STATES PATENTS

| | | |
|---|---|---|
| 2,490,642 | Lipson | Dec. 6, 1949 |
| 2,557,868 | Fua et al. | June 19, 1951 |
| 2,575,769 | Rajchman et al. | Nov. 20, 1951 |
| 2,601,583 | Ballou | June 24, 1952 |
| 2,681,416 | Thompson | June 15, 1954 |
| 2,682,000 | Clayton et al. | June 22, 1954 |
| 2,708,721 | Ziffer | May 17, 1955 |
| 2,712,081 | Fearon et al. | June 28, 1955 |
| 2,716,523 | Driver | Aug. 30, 1955 |
| 2,734,418 | Enns | Feb. 14, 1956 |

OTHER REFERENCES

An Anticoincidece Gamma-Ray Scintillation Spectrometer, by Richard D. Albert, from The Review of Scientific Instruments, vol. 24, No. 12, December 1953.